(12) United States Patent
Abali et al.

(10) Patent No.: US 12,182,627 B2
(45) Date of Patent: Dec. 31, 2024

(54) ACCELERATOR TRUSTWORTHINESS

(71) Applicant: INTERNATIONAL BUSINESS MACHINES CORPORATION, Armonk, NY (US)

(72) Inventors: Bulent Abali, Tenafly, NJ (US); Alper Buyuktosunoglu, White Plains, NY (US); Cedric Lichtenau, Stuttgart (DE)

(73) Assignee: International Business Machines Corporation, Armonk, NY (US)

( * ) Notice: Subject to any disclaimer, the term of this patent is extended or adjusted under 35 U.S.C. 154(b) by 563 days.

(21) Appl. No.: 17/455,583

(22) Filed: Nov. 18, 2021

(65) Prior Publication Data
US 2023/0153168 A1 May 18, 2023

(51) Int. Cl.
*G06F 9/50* (2006.01)
*G06F 9/38* (2018.01)
*H04L 9/08* (2006.01)
*H04L 9/32* (2006.01)

(52) U.S. Cl.
CPC .......... *G06F 9/5072* (2013.01); *G06F 9/3877* (2013.01); *G06F 9/505* (2013.01); *H04L 9/0819* (2013.01); *H04L 9/3236* (2013.01)

(58) Field of Classification Search
None
See application file for complete search history.

(56) References Cited

U.S. PATENT DOCUMENTS

| | | | |
|---|---|---|---|
| 2016/0283717 A1* | 9/2016 | LeMay | G06F 21/567 |
| 2018/0006807 A1* | 1/2018 | Suresh | H04L 9/0618 |
| 2018/0152201 A1* | 5/2018 | Gopal | G06F 8/656 |
| 2019/0042249 A1 | 2/2019 | Suresh et al. | |
| 2019/0044705 A1 | 2/2019 | Deval et al. | |
| 2019/0236022 A1 | 8/2019 | Gopal et al. | |
| 2020/0167488 A1 | 5/2020 | Yitbarek et al. | |
| 2020/0228388 A1* | 7/2020 | Schulz | H04L 67/10 |
| 2021/0110066 A1* | 4/2021 | Liu | G06F 21/72 |
| 2021/0112073 A1* | 4/2021 | Schulz | H04L 9/0825 |
| 2021/0117246 A1* | 4/2021 | Lal | G06T 1/20 |
| 2021/0117249 A1* | 4/2021 | Doshi | H04L 67/1001 |
| 2021/0160060 A1 | 5/2021 | Liu et al. | |
| 2021/0165730 A1* | 6/2021 | Surya | G06F 11/0772 |

(Continued)

OTHER PUBLICATIONS

Sarmenta, Luis F. G. et al., "Virtual Monotonic Counter and Count-Limited Objects using a TPM without a Trusted OS", Proceedings of the First ACM Workshop on Scalable Trusted Computing (STC'06), 2006, ACM, (pp. 15).

(Continued)

*Primary Examiner* — Adam Lee
(74) *Attorney, Agent, or Firm* — Tihon Poltavets

(57) ABSTRACT

Trustworthiness of an accelerator in heterogenous systems is increased. A workload of an application is offloaded to an accelerator for the accelerator to perform the workload. The accelerator is ensured to generate an output of the workload based on offloading the workload. The accelerator is identified as generating an output of the workload based on offloading the workload. Both an input and the output of the workload are ensured to be authentic based on offloading the (Continued)

workload to the accelerator. Both the input and the output of the workload are ensured to be securely transmitted based on offloading the workload to the accelerator.

20 Claims, 10 Drawing Sheets

(56) References Cited

U.S. PATENT DOCUMENTS

| | | | | |
|---|---|---|---|---|
| 2021/0182436 | A1 | 6/2021 | Bennison | |
| 2021/0250174 | A1* | 8/2021 | Cheng | H04L 9/0869 |
| 2021/0281392 | A1 | 9/2021 | Sofia et al. | |
| 2021/0389993 | A1* | 12/2021 | Cheng | G06F 9/5027 |
| 2021/0391985 | A1* | 12/2021 | Bhunia | H04L 9/088 |
| 2023/0042858 | A1* | 2/2023 | Singh | G06F 9/4843 |

OTHER PUBLICATIONS

International Searching Authority, "Notification of Transmittal of the International Search Report and the Written Opinion of the International Searching Authority, or Declaration," Patent Cooperation Treaty, Mar. 31, 2023, 12 pages, International Application No. PCT/EP2022/082303.

Jackson, "Overview of Changes to PCI Express 3.0", Mindshare, https://www.mindshare.com/files/resources/PCIe%203-0.pdf, 2012, 4 Pages.

McGrew et al., "The Galois/Counter Mode of Operation (GCM)", 2005, https://luca-giuzzi.unibs.it/corsi/Support/papers-cryptography/gcm-spec.pdf, 43 Pages.

Unknown, "AES-GCM authenticated encryption", CryptoSys PKI Pro Manual, accessed on Jul. 8, 2024, https://www.cryptosys.net/pki/manpki/pki_aesgcmauthencryption.html, 1 Page.

Unknown, "GCM Mode," 2020.1, accessed on Jul. 8, 2024, https://xilinx.github.io/Vitis_Libraries/security/2020.1/guide_L1/internals/gcm.html, 5 Pages.

Unknown, "GMAC," 2020.1, accessed on Jul. 8, 2024, https://xilinx.github.io/Vitis_Libraries/security/2020.1/guide_L1/internals/gmac.html 3 Pages.

Wikipedia, "Galois/Counter Mode", Wikipedia, the free encyclopedia, accessed on Jul. 8, 2024, 6 Pages, https://en.wikipedia.org/wiki/Galois/Counter_Mode#cite_note-17.

Wikipedia, "Public key infrastructure", Wikipedia, the free encyclopedia, accessed on Jul. 8, 2024, 10 Pages, https://en.wikipedia.org/wiki/Public_key_infrastructure#Certificate_authorities.

Wong, "PCI-E Maximum Payload Size—The BIOS Optimization Guide", The Famous Tech ARP BIOS Guide!, Aug. 21, 2017, https://www.techarp.com/bios-guide/pci-e-maximum-payload-size/, 2 Pages.

* cited by examiner

ACCELERATOR TRUSTWORTHINESS

BACKGROUND

The present invention relates in general to computing systems, and more particularly, to various embodiments for increasing trustworthiness of an accelerator in heterogenous computing systems using a computing processor.

SUMMARY

According to an embodiment of the present invention, a method for increasing trustworthiness of an accelerator in heterogenous systems in a computing environment, by one or more processors, is depicted. A workload of an application is offloaded to an accelerator for the accelerator to perform the workload. The accelerator is ensured to generate an output of the workload based on offloading the workload. The accelerator is identified as generating an output of the workload based on offloading the workload. Both an input and the output of the workload are ensured to be authentic based on offloading the workload to the accelerator. Both the input and the output of the workload are ensured to be securely transmitted based on offloading the workload to the accelerator.

In an additional aspect, the workload of an application is received by an accelerator for the accelerator to perform the workload. The generated workload output of the workload is ensured to be performed by the accelerator by identifying the accelerator performed the workload, wherein the accelerator is authenticated.

An embodiment includes a computer usable program product. The computer usable program product includes a computer-readable storage device, and program instructions stored on the storage device.

An embodiment includes a computer system. The computer system includes a processor, a computer-readable memory, and a computer-readable storage device, and program instructions stored on the storage device for execution by the processor via the memory.

Thus, in addition to the foregoing exemplary method embodiments, other exemplary system and computer product embodiments for increasing trustworthiness of an accelerator are provided.

DETAILED DESCRIPTION OF THE DRAWINGS

Figure 1:
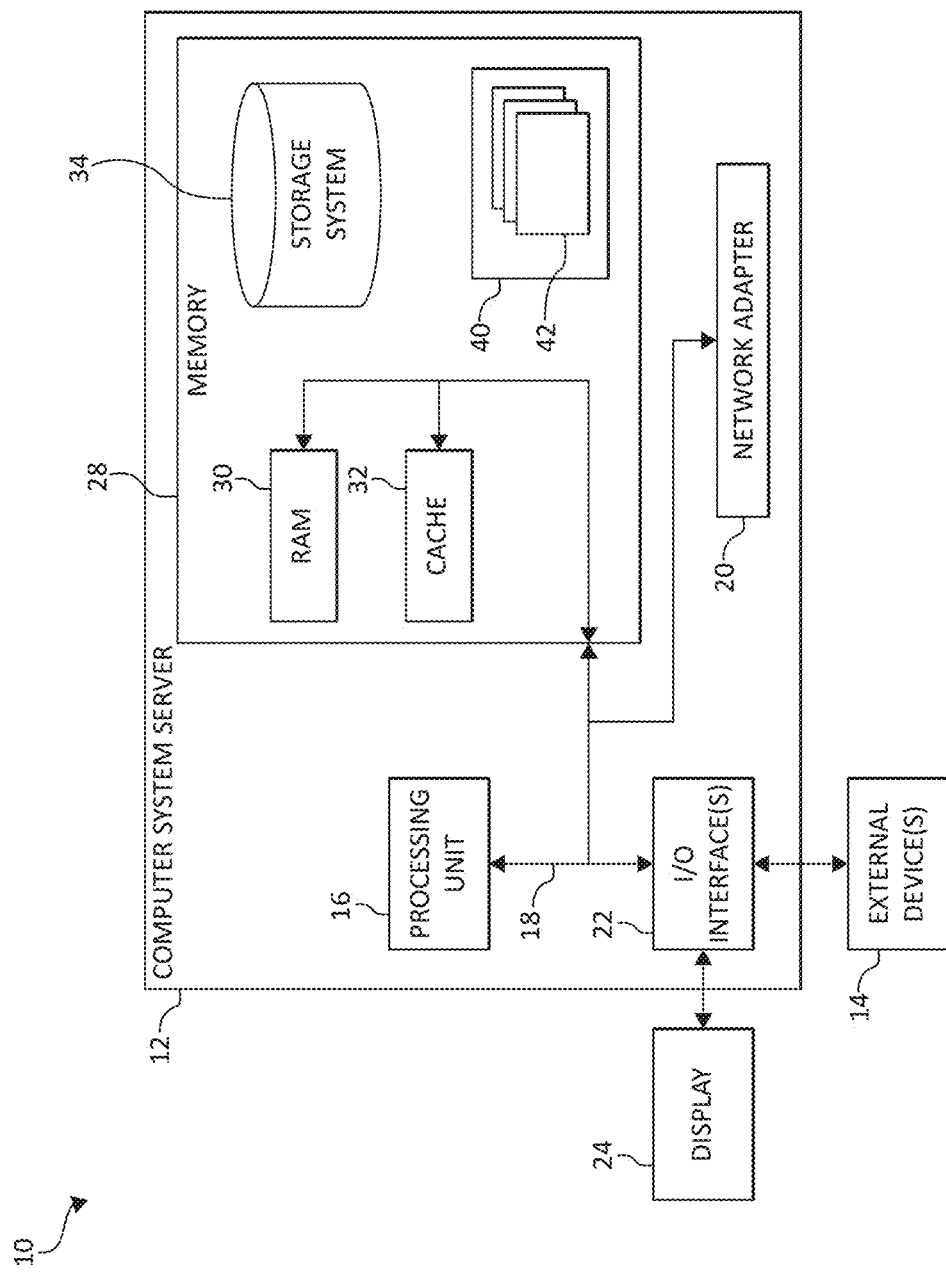
FIG. 1 is a block diagram depicting an exemplary cloud computing node according to an embodiment of the present invention.

The present invention relates generally to computing systems, and more particularly, to various embodiments for increasing trustworthiness of an accelerator in heterogenous computing systems and the like.

In today's computing environment, computer systems are often made up of several different processing units such as, for example, central processing units ("CPUs"), graphics processing units ("GPUs"), accelerated processing unit ("APUs") (e.g., "accelerators"), field programmable gate arrays ("FPGAs"), accelerators, Input/Output ("I/O") devices, and other dedicated processing units. Such systems are referred to as heterogeneous systems. In some computing systems, processors are heterogeneous system-on-chips (SoCs) containing CPU cores and GPU cores. That is, a heterogeneous SoC may include disparate processing elements ("PE") such as, for example, CPU cores, GPUs, accelerators, I/O devices, and the like. Applications on different processing elements (PEs) may have different memory characteristics, access patterns and performance requirements.

Heterogeneous SoCs are pervasively used today to meet increasing levels of integration and stringent performance and efficiency requirements of heterogeneous applications. For example, automotive applications can vary from radar detection, image processing, obstacle avoidance, communication, swarm intelligence to driving control decisions. These heterogeneous applications may be associated with priorities and deadlines to meet real-time and constraints such as, for example, safety constraints in a vehicle.

Due to the dynamism of surrounding external environments and conditions, many computing systems, models, or users may be trusted while other are untrustworthy. For example, accelerators may be shared along with providing multi-user capabilities. Additionally, lengthy processing jobs may be performed in multiple job steps with multiple users accessing the accelerators in an interleaved fashion. As such, these computing systems, models, or users may intentionally or accidently compromise the integrity of the overall computing system.

Thus, an accelerator may be subject to the trustworthiness becoming compromised or reduced. For example, an accelerator library or the framework or firmware may be infected by users, and malicious insiders, for example system administrators. In another attack scenario, a man-in the middle scenario (e.g., an attacker intercepts communications or processes between two parties), may intercept input/output ("I/O") signals and/or infect I/O data. For example, consider the following scenarios. First, user input into the accelerator is tampered with and the plain-input is modified or a cipher-input is modified by replacing with an earlier valid cipher-input. Second, user output from the accelerator is tampered with and the plain-output is modified, and the cipher-output is modified by replacing with an earlier valid cipher-output. Third, an accelerator state is tampered with and 1) the input data is valid, but the initial state is wrong resulting in an incorrect output result, 2) the input data is valid, but the accelerator firmware is tampered with resulting in an incorrect computation (or the firmware security is compromised). Thus, these scenarios provide insight into the need to decrease the security vulnerabilities in a computing system. For specifically, a need exists for increasing the trustworthiness for accelerators in a computing system.

Accordingly, various aspects of the various implementations provide novel solutions to increase trustworthiness of an accelerator in heterogenous systems in a computing environment, by one or more processors, is depicted. A workload of an application is offloaded to an accelerator for the accelerator to perform the workload. The accelerator is ensured to generate an output of the workload based on offloading the workload. The accelerator is identified as generating an output of the workload based on offloading the workload. Input and output of the workload are checked and ensured to be authentic based on offloading the workload to the accelerator. Also, the input and output of the workload are ensured to be transmitted (e.g., transmitted secretly/securely such as, for example, encrypted and unintelligible/invisible on a communication link) based on offloading the workload to the accelerator.

In some implementations, the present invention provides secure and/or authenticated communication and processing between a host computer system and attached accelerator where the accelerator may be shared by multiple users. Accelerator jobs may be executed in multiple job steps with interleaving of users. Encrypted and/or authenticated random read/write access from accelerator to the system memory is also provided as opposed to other operations requiring sequential streamed data. As used therein, the term "authenticated" means that neither the accelerator identity (e.g., a rogue accelerator is not substituted for the actual accelerator), nor the initial state of the accelerator, nor the data exchanged between a computer system and the accelerator have been tampered with even when accelerator data is exchanged in plaintext. The term "secure" means that data exchanged between a computing system and the accelerator is encrypted and unintelligible/invisible on a communication link (e.g., PCIe bus) in addition to accelerator authentication.

In additional aspect, various implementations provide for secure and/or authenticated communication between a host computer system and an attached multiuser accelerator for securely processing data and operations. In some implementations, the following operations may be performed by the application and/or the accelerator to authenticate and/or secure the accelerator identity, state and input/output data.

First, on a host computing system, an application (e.g., a user) generates a shared-secret referred to a "job-key" that is transmitted to the accelerator using a public-key cryptosystem.

Second, the application generates a security sequence number (also called Nonce in cryptography). Those skilled in the art know that when sequence numbers are encrypted then combined with the user data, for example using the logical exclusive-or operation, the final result is the encrypted user data.

Third, the application transmits the job input data to the accelerator and the sequence number, and a hash of the all the information. The application may secure the job input data by encrypting (see the GCM encryption 612 of FIG. 6A) it before transmitting to the accelerator.

Fourth, the accelerator verifies that the job input data is secured and authentic (e.g., not tampered with) by comparing the accelerator's internally generated hash and sequence numbers with the application supplied of the generated hash and sequence numbers. The accelerator may decrypt (see block 629 of FIG. 6A) the job input data when encrypted by the application Fifth, the accelerator executes the operation (e.g., the job, task, or process) and increments the sequence number, hashes the internal state of itself (e.g., the accelerator) and job output data and sequence number.

Sixth, the accelerator returns the job output, the incremented sequence number, and the hash to the application on the host system. The accelerator may secure the job output data by encrypting (see block 640 of FIG. 6A) it before transmitting to the application. Seventh, the application verifies that the job output data or the accelerator state and identity are authentic and secured (e.g., not tampered with) by hashing and comparing the accelerator's internal state of itself and the sequence number with the accelerator returned hash and sequence number. The application may decrypt (see block 641 of FIG. 6A) the job output data when encrypted by the accelerator. Eighth, the application resumes the execution of the multiple step job from step 2 above (e.g., application generates a security sequence number), the application generates a security sequence number (also called Nonce in cryptography).

In another aspect, various implementations provide for supporting random access by a synchronized common clock on the host system and the accelerator such that the sequence number (e.g., the security nonce) is derived from the synchronized clocks as a common value instead of a simple sequence incrementation. In addition to synchronized clocks, an even-odd clock phase is returned in a vendor defined field of the I/O transmission protocol (e.g., peripheral component interconnect "PCI" transport layer protocol "TLP" Prefix field of PCIe datagrams). By knowing an even-odd clock phase, a receiver is permitted to know the actual clock value at the time of send. This is necessary, when the message is sent in clock cycle N but received in cycle N+1, where "N" is a positive integer. In some variations, rather than using PCI TLP Prefix, but an implicit Nonce is synchronously tracked by both the host system and the accelerator by both sides counting the number of accesses made and using that synchronized count as the Nonce.

It should be noted that as used herein, for AES-GCM encryption, there may be four inputs for authenticated encryption: 1) the secret key, 2) initialization vector (IV) (e.g., a Nonce), 3) plaintext (e.g., unencrypted data), and 4) optional and additional authentication data (AAD). The nonce and AAD may be passed in a system "as is". There are two outputs: 1) the ciphertext, which is exactly the same length as the plaintext, and 2) an authentication tag (the "tag" or "ATAG"). The ATAG may be called the message authentication code (MAC) or integrity check value (ICV).

For AES-GCM decryption, the authenticated decryption operation is similar to the encrypt operation, but with the order of the hash step and encryption step reversed. The tag T' that is computed by the decryption operation is compared to the tag T associated with the ciphertext C. If the two tags match (in both length and value), then the plaintext P is returned. Otherwise, the special symbol FAIL is returned In general, as used herein, "optimize" may refer to and/or defined as "maximize," "minimize," "best," or attain one or more specific targets, objectives, goals, or intentions. Optimize may also refer to maximizing a benefit to a user (e.g., maximize a trained machine learning scheduling agent benefit). Optimize may also refer to making the most effective or functional use of a situation, opportunity, or resource.

Additionally, optimizing need not refer to a best solution or result but may refer to a solution or result that "is good enough" for a particular application, for example. In some implementations, an objective is to suggest a "best" combination of operations, schedules, PE's, and/or machine learning models/machine learning pipelines, but there may be a variety of factors that may result in alternate suggestion of a combination of operations, schedules, PE's, and/or machine learning models/machine learning pipelines yielding better results. Herein, the term "optimize" may refer to such results based on minima (or maxima, depending on what parameters are considered in the optimization problem). In an additional aspect, the terms "optimize" and/or "optimizing" may refer to an operation performed in order to achieve an improved result such as reduced execution costs or increased resource utilization, whether or not the optimum result is actually achieved. Similarly, the term "optimize" may refer to a component for performing such an improvement operation, and the term "optimized" may be used to describe the result of such an improvement operation.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random-access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
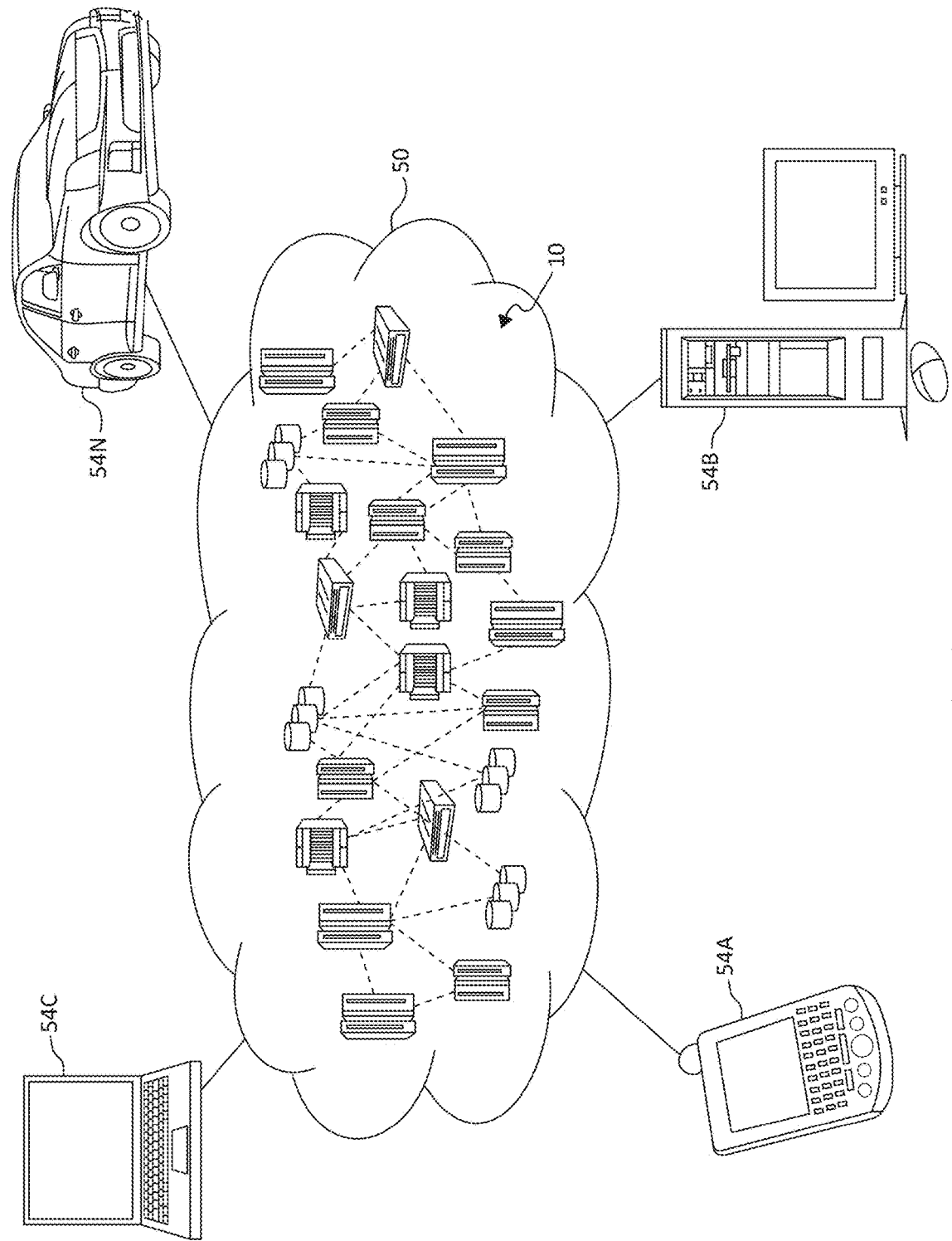
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
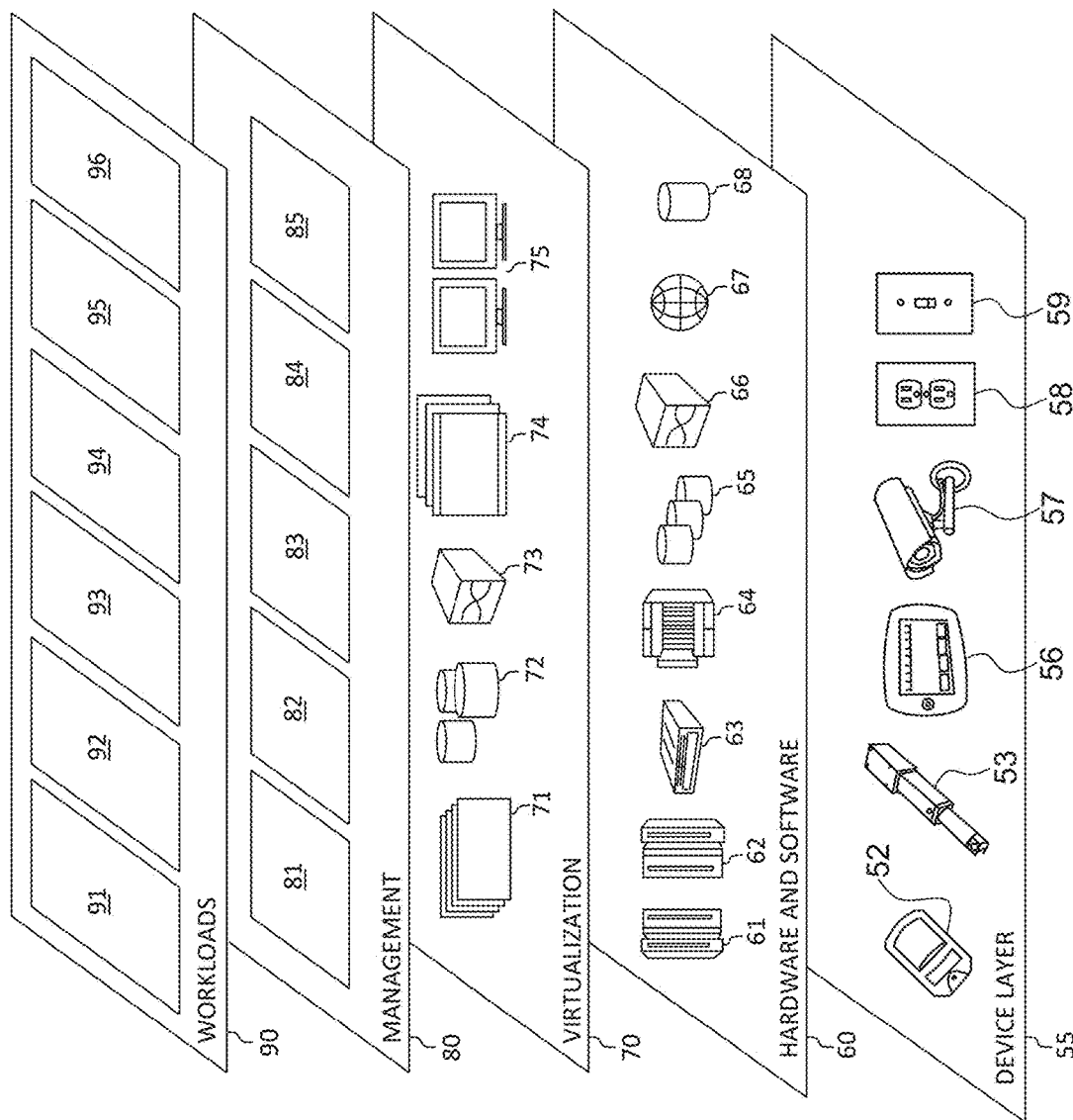
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote-control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for increasing trustworthiness of an accelerator in a computing environment (e.g., in a neural network architecture). In addition, workloads and functions 96 for increasing trustworthiness of an accelerator in a computing environment may include such operations as analytics, deep learning, and as will be further described, user and device management functions. One of ordinary skill in the art will appreciate that the workloads and functions 96 for increasing trustworthiness of an accelerator in a computing environment may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously stated, the present invention provides novel solutions for increasing trustworthiness of an accelerator in heterogenous systems in a computing environment. In some implementations, provides for increasing trustworthiness of an accelerator by leveraging security algorithms proven secure (e.g., Galois/Counter Mode ("GCM") and Galois Message Authentication Code ("GMAC") while supporting at least three key functions. The three key functions are 1) accelerator authentication, 2) authenticating I/O data for an accelerator, and 3) using confidential I/O data for an accelerator.

In function 1), the accelerator authentication operation includes verification, as part of a job execution, the identity and the initial state of the accelerator. A crypto-hash of the accelerator internal state may be calculated that may be verified (e.g., by a user or machine learning) as part of job operation. A symmetric key encryption operation (e.g., AES or any other) may be used for exchange. A public key encryption operation may be used only for symmetric key exchange. Thus, the accelerator authentication operation verifies that the accelerator is correctly initialized, and verifies that the I/O's, registers, or memory are not tampered with before starting a new job or work operation.

In function 2), the operation of authenticating I/O data for an accelerator is performed even when I/O data is exchanged in plaintext between the user and the accelerator. Tampering of the I/O data is detected by the authentication of I/O data even when application and the accelerator exchange the data in plaintext. In function 3), for the confidential I/O data for an accelerator, the confidential I/O data is exchanged as ciphertext, and the confidential I/O functionality subsumes I/O authentication.

Figure 4:
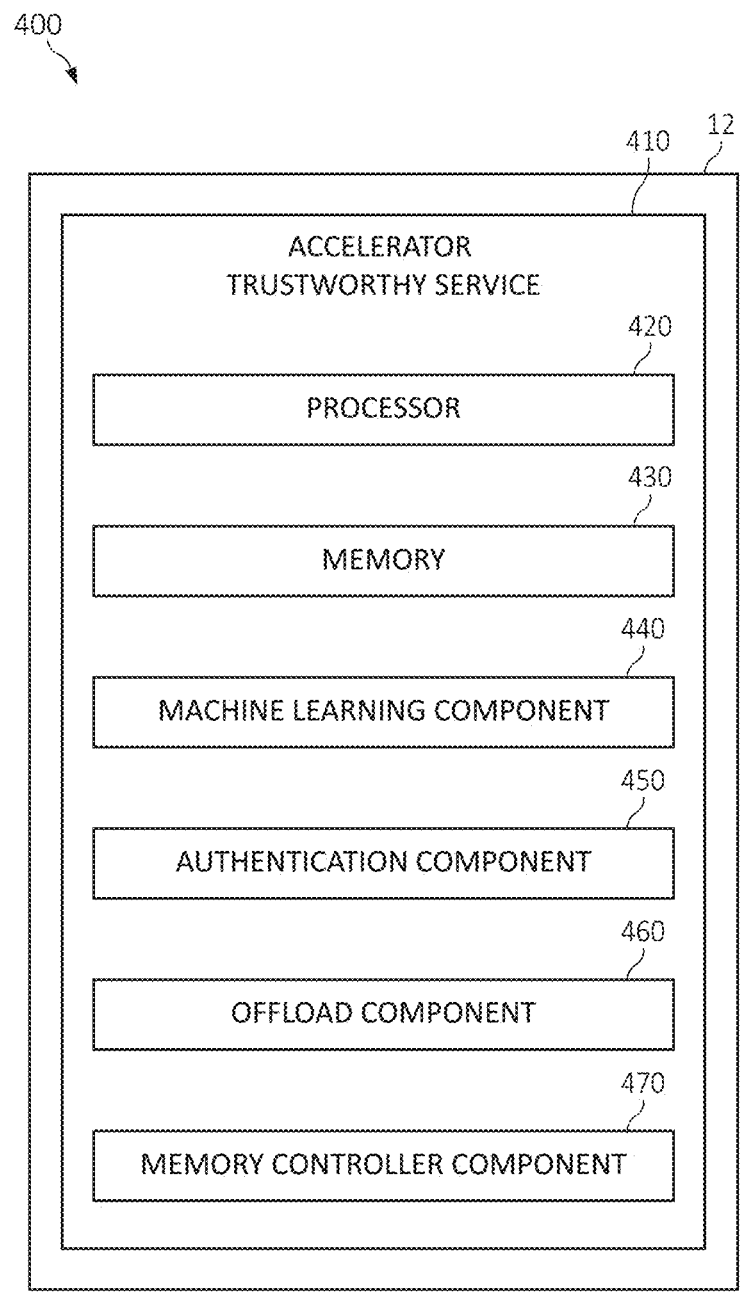
FIG. 4 is an additional block diagram depicting an exemplary functional relationship between various aspects of the present invention.

Turning now to FIG. 4, a block diagram depicting exemplary functional components of system 400 for increasing trustworthiness of an accelerator in heterogenous systems in a computing environment according to various mechanisms of the illustrated embodiments is shown. In one aspect, one or more of the components, modules, services, applications, and/or functions described in FIGS. 1-3 may be used in FIG. 4. As will be seen, many of the functional blocks may also be considered "modules" or "components" of functionality, in the same descriptive sense as has been previously described in FIGS. 1-3.

An accelerator trustworthy service 410 is shown, incorporating processing unit 420 ("processor") to perform various computational, data processing and other functionality in accordance with various aspects of the present invention. In one aspect, the processor 420 and memory 430 may be internal and/or external to the accelerator trustworthy service 410, and internal and/or external to the computing system/server 12. The accelerator trustworthy service 410 may be included and/or external to the computer system/server 12, as described in FIG. 1. The processing unit 420 may be in communication with the memory 430. The accelerator trustworthy service 410 may include a machine learning component 440, an authentication component 450, an offload component 460, and a memory controller component 470.

In one aspect, the system 400 may provide virtualized computing services (i.e., virtualized computing, virtualized storage, virtualized networking, etc.). More specifically, the system 400 may provide virtualized computing, virtualized storage, virtualized networking and other virtualized services that are executing on a hardware substrate.

The accelerator trustworthy service 410 may, using the machine learning component 440, the authentication component 450, the offload component 460, and/or the memory controller component 470, offload a workload of an application to an accelerator for the accelerator to perform the workload, ensure the accelerator generated an output of the workload based on offloading the workload, and identify the accelerator generated an output of the workload based on offloading the workload.

In some implementations, the authentication component 450, for ensuring the accelerator generated the output of the workload, may receive a job key from the application using a public key cryptography operation. In some implementations, the authentication component 450, for ensuring the accelerator generated the output of the workload, may receive a security sequence number and a hash from the application.

In some implementations, the authentication component 450, for receiving the security sequence number and the hash from the application, may receive the security sequence number as a common value between the application and the accelerator where the security sequence number is generated from a synchronized common clock.

In some implementations, the authentication component 450, for ensuring the accelerator generated the output of the workload, may compare the security sequence number and the hash received from the application with an accelerator generated security sequence number and an accelerator generated hash.

The accelerator trustworthy service 410 may, using the machine learning component 440, the authentication component 450, the offload component 460, and/or the memory controller component 470, may perform the workload by the accelerator, increment an accelerator generated security sequence number, generate a state hash of the accelerator, and send the output, the incremented accelerator generated security sequence number, and the state hash to enable the application to authenticate the accelerator generated output.

The accelerator trustworthy service 410 may, using the machine learning component 440, the authentication component 450, the offload component 460, and/or the memory controller component 470, may synchronously track an implicit nonce by at least the accelerator and counting a number of access times by the accelerator to system memory.

In one aspect, the machine learning component 440 as described herein, may perform various machine learning operations using a wide variety of methods or combinations of methods, such as supervised learning, unsupervised learning, temporal difference learning, reinforcement learning and so forth. Some non-limiting examples of supervised learning which may be used with the present technology include AODE (averaged one-dependence estimators), artificial neural network, backpropagation, Bayesian statistics, naive bays classifier, Bayesian network, Bayesian knowledge base, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting example of temporal difference learning may include Q-learning and learning automata. Specific details regarding any of the examples of supervised, unsupervised, temporal difference or other machine learning described in this paragraph are known and are within the scope of this disclosure. Also, when deploying one or more machine learning models, a computing device may be first tested in a controlled environment before being deployed in a public setting. Also even when deployed in a public environment (e.g., external to the controlled, testing environment), the computing devices may be monitored for compliance.

Figure 5A:
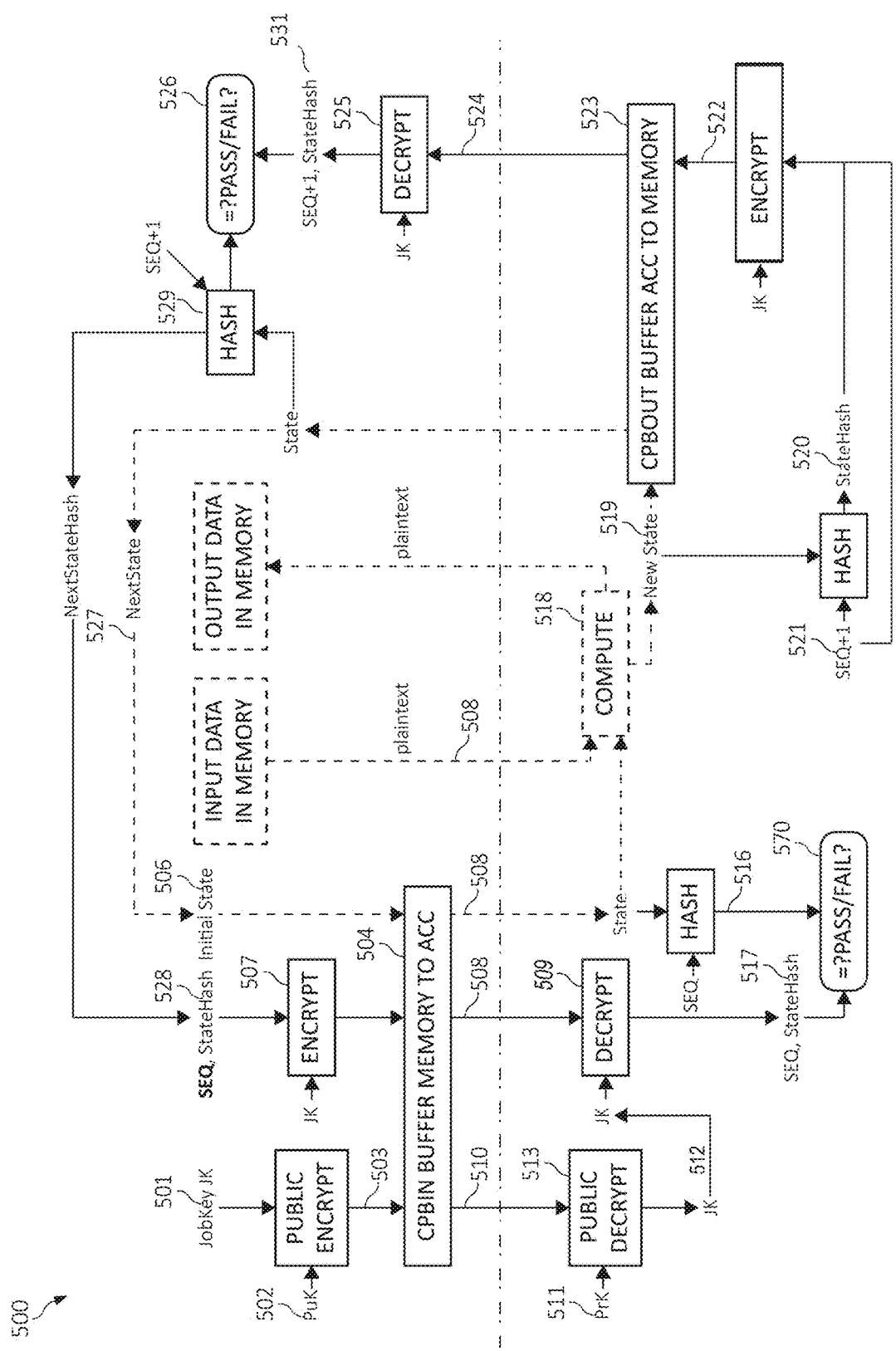
FIG. 5A depicts a block flow diagram depicting operations for performing accelerator authentication for increasing trustworthiness of an accelerator in heterogenous systems in a computing environment according to an embodiment of the present invention.

Turning now to FIGS. 5A, a method 500 for performing accelerator authentication for increasing trustworthiness of an accelerator in heterogenous systems in a computing environment using a processor is depicted, in which various aspects of the illustrated embodiments may be implemented. The functionality 500 may be implemented as a method (e.g., a computer-implemented method) executed as instructions on a machine, where the instructions are included on at least one computer readable medium or one non-transitory machine-readable storage medium.

The functionality 500 may start in block 501, by an application (e.g., a user) generating a job key ("JK") to be used as a shared secret between the application and the accelerator. The job key is a one-time use symmetric crypto key for one accelerator job. The job key is transmitted to the accelerator with another encryption method called public-key cryptography. It should be noted that in public-key cryptography, the encryption keys are asymmetrically used. A message encrypted with a public key (by the application) can only be decrypted with a private key (by the accelerator). As used herein, the accelerator has a private key known only to a defined manufacturer or entity (e.g., a single entity) while the public key is publicly known.

In block 502, the job key may be encrypted with a public key ("PuK"). The encrypted job key may be sent to an accelerator via a secure channel 503 (e.g., a public encrypt secure channel). That is, the public encrypt secure channel is used to ship/send the encrypted job key ("eJK"). The encrypted job key is written into a coprocessor accelerator parameter block "CPB" input ("CPBin") buffer ((e.g., eJK=ENC(PuK, JK), where the CPB is transferred from host memory to an accelerator, as in block 504.

As an input to block 507, the application (e.g., user) may generate a sequence number ("SEQ"), which may be a nonce. The SEQ is a sequence number, as an input of encryption, decryption, and authentication operations, and the sequence number may be incremented in each job step or with each unit of data exchanged between the accelerator and the host system.

Also, a crypto-hashed accelerator state (e.g., "statehash"), which is linked a next state hash 528), may be concatenated with the SEQ and herein after referred to as "payload." In block 507, the payload may be encrypted with the job key JK. In block 508, the encrypted job key for the payload may also be written into the CPBin buffer 504 (e.g., ePay<=ENC (JK, Payload).

In block 506, the application provides the expected initial state of the accelerator (e.g., "initial state") to the accelerator. Also, in block 507, a payload may be encrypted. The initial state may be written into the CPBin buffer 504. In block/step 508, the job may be sent to the accelerator ("ACC").

The accelerator may read the encrypted job key 510 (e.g., eJK) and the encrypted payload 509 (e.g., eJPay) from the CPBin buffers 504.

The job key 512 may be recovered by using the private encryption key ("PrK") 511 to decrypt the encrypted job key 510 (e.g., eJK), as in block 513, which then results in the job key ("JK") 512. Therefore, the application 501 and the accelerator 512 share the secret job key JK after this step.

The payload (ePay) may be decrypted with the job key, as in block 509, which results in a supplied accelerator state ("AccState") hash 517 (e.g., SEQ, Statehash 517). Also, the accelerator may calculate the internal state hash 516 (e.g., "Hash" box 516). The accelerator may compare the accelerator state ("AccState") hash 517 and the internal state hash 516, as in block 570. If the states 516 and 517 are mismatched, it indicates that the application supplied state 508 has been tampered with or corrupted during transmission, and therefore a "fail" notification is indicated and returned. If, however, the states 516 and 517 match, a "pass" notification is indicated, as in block 570.

The accelerator may increment the SEQ by a value of 1 or by some other value, as in block 521. The accelerator may determine/compute the job, as in block 518. A new accelerator state hash 520 ("new state") may be determined/calculated using cryptohash of the actual internal state 519 of the accelerator. The internal state 519 is also a new internal state that is determined/calculated.

A new sequence key ("SEQ+1") and state hash herein after referred to as "payload" (or payload') may be encrypted with a job key (JK) 522. The encrypted payload (e.g., the SEQ+1 and state hash), may also be written into a CPBin buffer 523 (e.g., ePay'<=ENC(JK, payload'). The new accelerator internal state 519 may also be written to the CPBin buffer 523, and the operations return 524 to the application (e.g., user).

In some implementations, the application (e.g., user) decrypts with the JK the information in the the CPBin buffer 523 to obtain the SEQ+1 and the state hash 525 as provided by the accelerator (e.g., Payload'=DEC UK, ePay'). The application separately calculates the state hash (e.g., SEQ+1 and the state hash as inputs) as in block 529.

In some implementations, the application (e.g., user) compares the accelerator supplied hash 525 with the state hash 529 that itself has calculated, as in block 526.

If the state hash 529 that the application has calculated and the state hash 531 that the application supplied are mismatched, a "fail" notification is indicated and returned. A fail signal indicates that the accelerator state have been tampered with or corrupted during transmission, therefore the accelerator cannot be trusted. If, however, the state hash 529 and the state hash 531 match, a "pass" notification is indicated, as in block 526. A pass signal indicates that the accelerator state can be trusted. If a match is present (e.g., pass), the application (e.g., user) saves the next state 527 for the next job operation. Also, a cryto-hashed version of the state is generated ("NextStateHash").

Figure 5B:
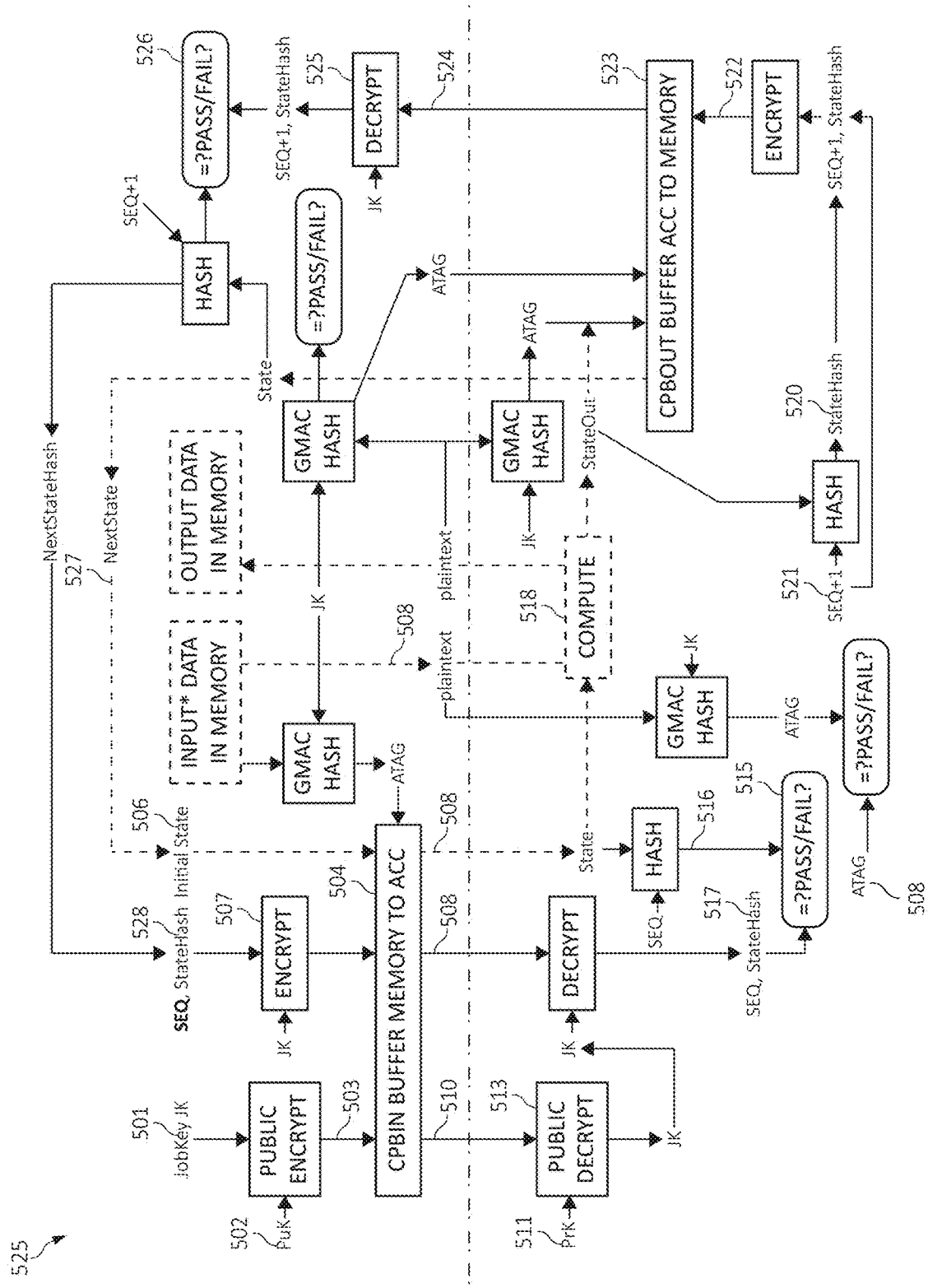
FIG. 5B depicts a block flow diagram depicting operations for performing accelerator authentication and input/output ("I/O") data authentication for increasing trustworthiness of an accelerator and its computed results in heterogenous systems in a computing environment according to an embodiment of the present invention.

Turning now to FIG. 5B, FIG. 5B depicts similar operations as FIG. 5A but uses Galois/Counter Mode ("GCM") and Galois Message Authentication Code ("GMAC") while supporting at least three key functions. FIG. 5B function adds to the FIG. 5A function by input/output data authentication in addition to the accelerator identity and state authentication. Repetitive description of like operations and steps of FIG. 5A and employed in FIG. 5B herein are omitted for sake of brevity.

As illustrated, the application (e.g., user) inputs plain text (e.g., unencrypted data) in memory (e.g., "input data in memory") to be authenticated using GMAC encryption method that may apply an authentication ("ATAG"). GMAC HASH functions of FIG. 5B produce a cryptographically secure hash of the accelerator input or output to produce an authentication tag ATAG. A pair of ATAG values, produced respectively by the accelerator and the application, are compared to verify that the exchanged data is authentic.

Figure 6A:
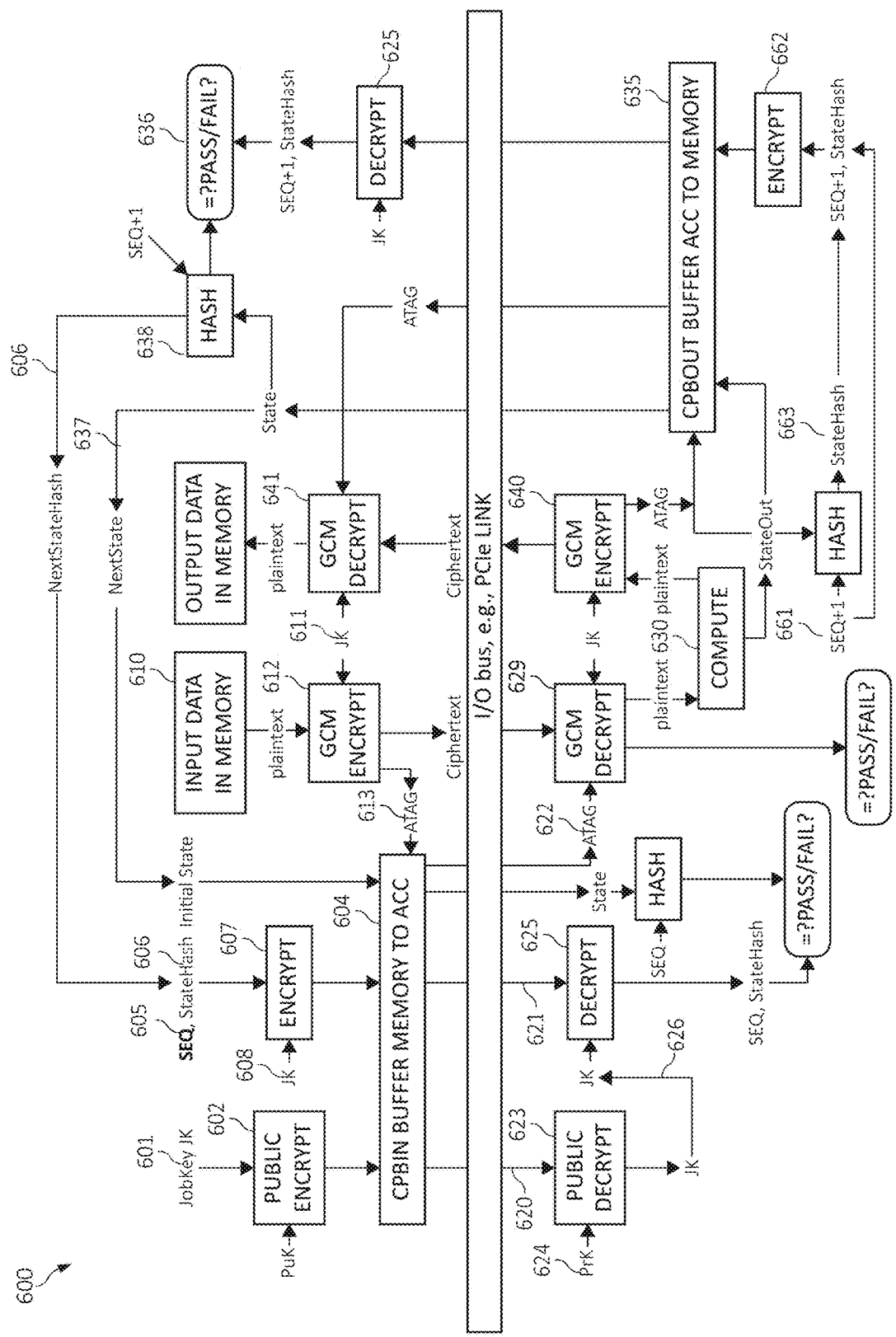
FIG. 6A-6B is a flowchart diagram depicting an exemplary method for securing and authentication of both the I/O data and the accelerator for increasing trustworthiness of an accelerator and its computed results in heterogenous systems in a computing environment according to an embodiment of the present invention.
Figure 6B:
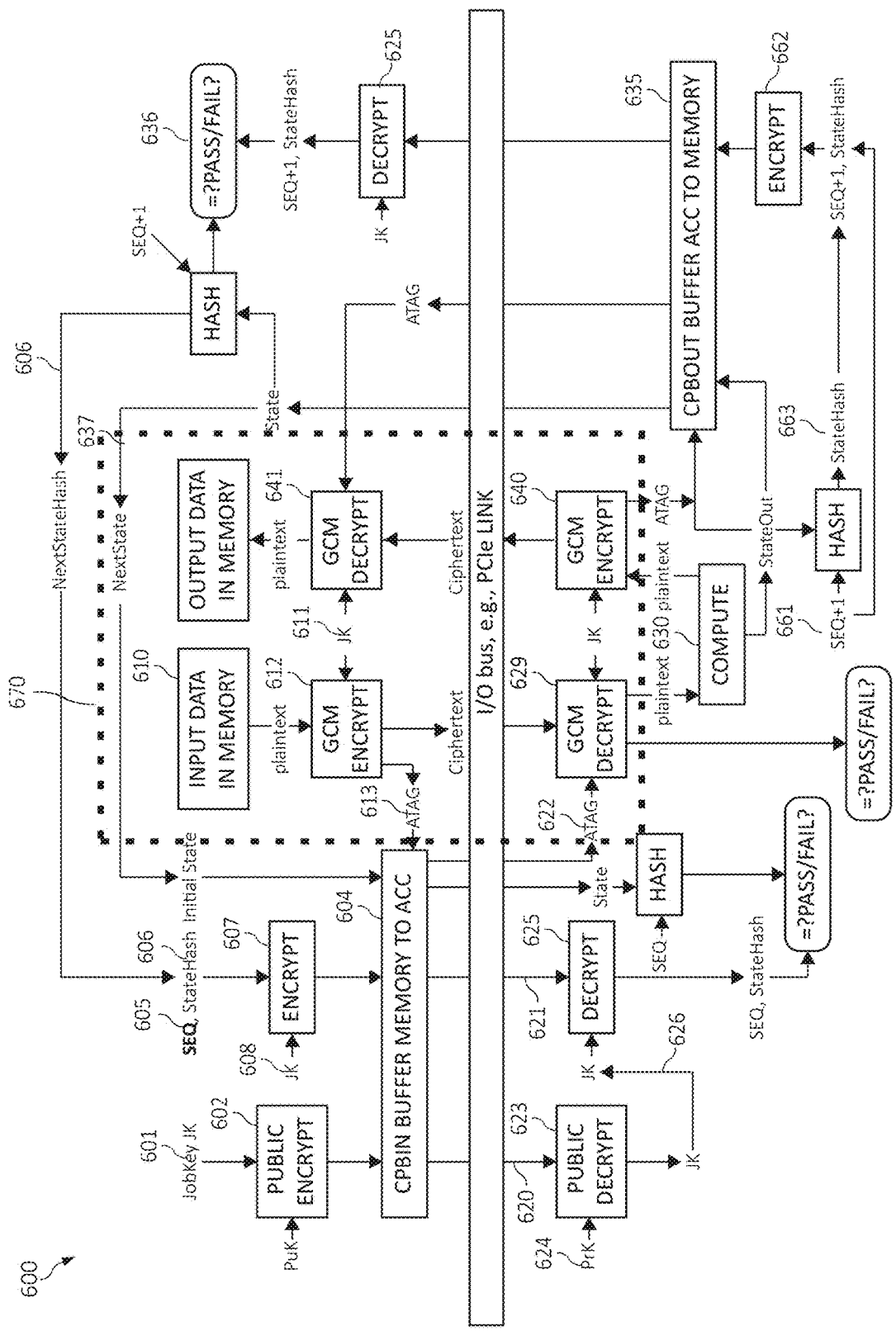

Turning now to FIGS. 6A-6B, a method 600 for securing I/O and authenticating an accelerator for increasing trustworthiness of an accelerator in heterogenous systems in a computing environment using a processor is depicted, in which various aspects of the illustrated embodiments may be implemented. The functionality 600 may be implemented as a method (e.g., a computer-implemented method) executed as instructions on a machine, where the instructions are included on at least one computer readable medium or one non-transitory machine-readable storage medium.

The functionality 600 may start, in step 601, by an application (e.g., a user) generating a job key ("JK") where the job key is a one-time use symmetric crypto key for one accelerator job.

In block 602, the job key may be encrypted with a public key ("PuK"). The encrypted job key may be sent to an accelerator ("ACC") via a secure channel. At block 604, the application may write the encrypted job key (e.g., the job key 601 that is encrypted with a public key), an encrypted payload, and an ATAG to a buffer (e.g., a coprocessor accelerator parameter block "CPB" input ("CPBin") buffer where the CPB is transferred from the accelerator to a host memory.

In block 605, the application (e.g., user) may generate a sequence number ("SEQ"), where the SEQ is a Nonce, a random number sequence number, as an input of encryption.

In block 606, any meta-confidential information necessary to complete the job may be concatenated. The accelerator state ("AccState") has been previously determined. In block 607, a payload (e.g., the SEQ, and statehash) may be encrypted using the shared secret job key JK 608.

In block 610, application (e.g., user) plaintext input data in a host memory may be initialized for being authenticated. At block 612, the plaintext input data, which needs to be secured, is encrypted with the GCM encryption function using the secret job key as input 611. The GCM encryption 612 also outputs an input authentication tag ATAG 613 which is copied in to the CPBIN BUFFER MEMORY 604.

From block 612 to block 629, ciphertext, which is an encrypted version of the input data provided for encryption in block 612, may be sent to the accelerator. Authentication tag ATAG 613 output from 612 may be sent to the accelerator arriving at the input 622 of the GCM DECRYPT at block 629. Accelerator reproduces the ATAG value internally, as in block 629, using the ciphertext provided from block 612. In block 629, the internal ATAG value is compared to the input supplied ATAG 612 value and produces a pass or fail signal to authenticate the input data.

The accelerator may receive the encrypted job key 620, the encrypted payload 621. The job key ("JK") 601 may encrypted with the private key in block 602, then may be decrypted, as in block 623 with the accelerator using the private key as in 623.

The encrypted payload 621 and encrypted input data may be decrypted with the job key, as in steps 625 and 629. At block 629 inputs, the encrypted input data (from block 612), the ATAG (from input 622), and the job key ("JK") from 626 may be received in order to execute a GCM decryption operation in the accelerator. The application (e.g., user) input data may be received by the accelerator to perform a compute operation, which may generate the result (output data) in plaintext and the current internal state, after the compute operation, of the accelerator ("stateout"), as in step 630. The current internal state is written to the CPBOUT Buffer 635. The accelerator result (output data) is encrypted with the GCM ENCRYPT of block 640. The encrypted output is sent to the application's GCM DECRYPT at block 641. The CPB output data is sent to the CPBout buffer where the CPBout data is transferred from the accelerator to a host memory, as in block 635.

The accelerator may take the SEQ value received from the application and increment it by some value (e.g., SEQ+1), and concatenate that value with the accelerator state (State-Out) and apply a hash thereto to generate a state hash 663, which uniquely identifies and authenticates the accelerator internal state at job step SEQ. The sequence value SEQ once hashed together with the accelerator state protects malicious parties from replaying a valid but old accelerator state. Once the accelerator completes the job, the accelerator concatenates any meta-confidential data to return a payload. That is, state hash ("StateHash") and the SEQ+1 may be encrypted 662 and the accelerator writes the encrypted data to the CPBout buffer 635 and returns the encrypted payload to the application's DECRYPT block 625.

The accelerator executes/computes the job, as in block 630.

The application (e.g., user) may decrypt the encrypted payload, as in step 625 using the shared secret job key 601. The application independently calculates a state hash 606 using accelerator supplied state and SEQ+1 as inputs. The application (e.g., user) verifies if the two state hashes, one received and one calculated, are equal. If yes, the authentication passes (e.g., succeeds), otherwise the authentication fails, as in step 636. The application (e.g., user) saves the accelerated state 637 for a next, subsequent job operation. The application (e.g., user) may hash the next accelerated state (e.g., "nextstatehash"), as in step 638.

Turning now to FIG. 6B, a region 670 (area within the dashed line) is depicted showing encryption and decryption functionalities need to produce a separate key when accelerator randomly accesses data in memory. In some implementations, exchanging the accelerator's state in plaintext and the state, the I/O data, and the SEQ may be concatenated and encrypted together.

Figure 7:
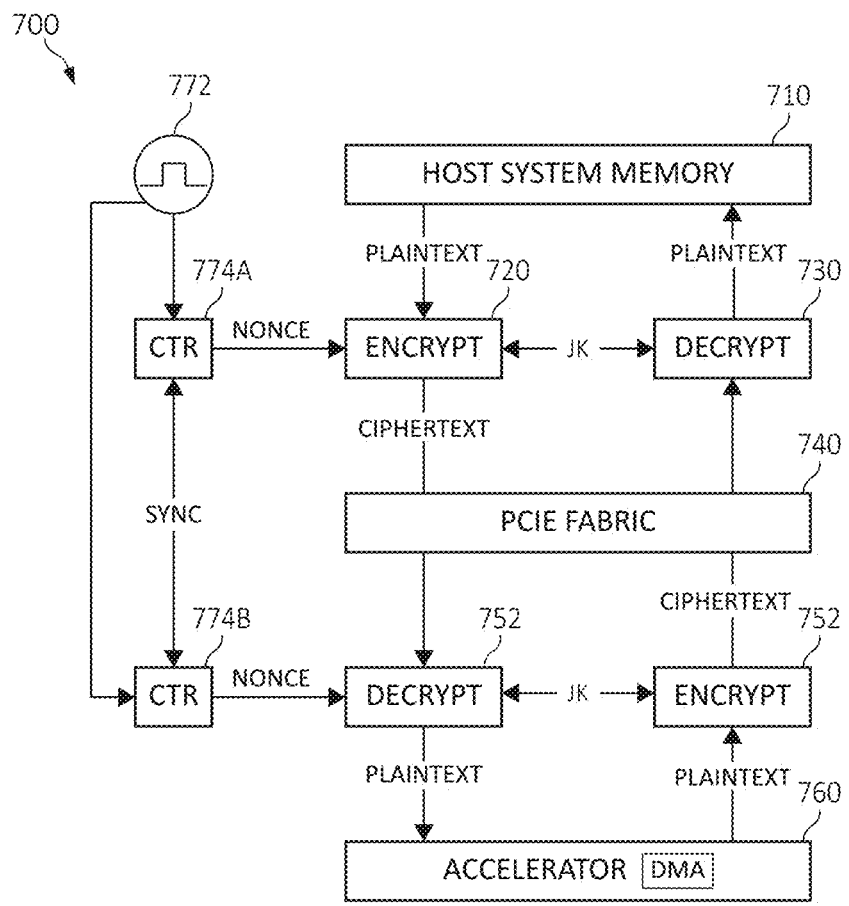
FIG. 7 is a block flow diagram depicting operations for providing random access support for increasing trustworthiness of an accelerator in heterogenous systems in a computing environment according to an embodiment of the present invention.

Turning now to FIG. 7, a block diagram depicting exemplary functional components of system 700 for providing random access support for increasing trustworthiness of an accelerator in heterogenous systems in a computing environment according to various mechanisms of the illustrated embodiments is shown. Random access means that the accelerator may access non-sequential locations in the host memory and at arbitrary points in time and unbeknownst to the host memory, e.g., using the Direct Memory Access method (DMA). The problem of random access is lack of coordination between the application running in the host memory and the accelerator, specifically not having synchronized sequence numbers SEQ as used in FIGS. 5A, 5B, 6A, and 6B. When host application and the accelerator do not use the same sequence numbers, one cannot decrypt the information encrypted by the other, nor authenticate the information.

In one aspect, one or more of the components, modules, services, applications, and/or functions described in FIGS. 1-6A-6B may be used in FIG. 7. As shown, various blocks of functionality are depicted with arrows designating the blocks' of system 700 relationships with each other and to show process flow (e.g., steps or operations). Additionally, descriptive information is also seen relating each of the functional blocks' of system 700. As will be seen, many of the functional blocks may also be considered "modules" of functionality, in the same descriptive sense as has been previously described in FIGS. 1-6A-6B. Repetitive description of like elements employed in other embodiments described herein is omitted for sake of brevity.

With the foregoing in mind, the module blocks' of systems 700 may also be incorporated into various hardware and software components of a system integrating disaggregated memory in a cloud computing environment in accordance with the present invention. Many of the functional blocks of systems 700 may execute as background processes on various components, either in distributed computing components, or elsewhere.

The system 700 may include a host system memory 710, an I/O fabric, e.g., a PCIE fabric 740, and an accelerator (e.g., with DMA capability) 760. The accelerator 760 may perform random access reads and writes to the host system memory 710. In order to secure the PCIE fabric 740 bus traffic, there may be at least two key operations. First, a synchronized clocks and counters may be used on a processor and the accelerator 760 as security Nonces. Second, odd/even clock cycles 772 may be encoded in a PCIe TLP prefix to identify a clock phase hence clock edge crossing. Odd/even clock cycle numbers are needed when output of the accelerator 752 may be transmitted in one clock cycle but received in the host block 730 in the next clock cycle. Knowing the odd/even phase of the clock allows security Nonce values to be corrected for the transmission delay.

In a counter ("CTR") mode of AES, an ever-changing count value (e.g., 128 bits) is required as a security nonce. It should be noted that a nonce is not required to be sequentially increasing or confidential. The only requirement is to use the nonce only once. Also, the CTR mode is an AES block cipher mode in which every step may be executed in parallel. CTR involves XOR-ing a sequence of pad vectors with plaintext and ciphertext blocks.

A synchronized pair of counters 774A, 774B in the application and in the accelerator are used as security Nonces, which enables AES or GCM CTR modes to be used.

An originator (e.g., the application or the accelerator) can send the clock derived Nonce along with the encrypted message such as, for example, ciphertext from an encryption operation 710 executed on plaintext 720 or ciphertext from an encryption operation 752 executed on plaintext 760. However, it will require two separate I/O messages; 1) a Nonce, and 2) the actual message. This presents two challenges. First, there are two separate messages that may impact adapter performance since twice as many messages must go across the PCIE fabric 740. The second challenge is clock crossing: when the message packet leaves the origin in CTR cycle "C" but arrives at destination cycle "C+1," the decryption must know that so that it will use CTR-1 value as the Nonce. Thus, a single bit in a vendor reserved field in the PCIe TLP packet is used to identify that clock phase. Thus, a sender encodes odd and even counter periods in the PCI TLP Prefix as 1 and 0, which can be extend to more than 2 periods (e.g., N periods to log2 N bits in the prefix). This may be necessary if the PCIe packet from start to finish crosses a clock boundary more than once. A TLP Prefix is a vendor defined hint. In this way, a receiver, when decrypting the packet, will know whether to use the CTR value C or C+1 by examining the TLP prefix. It should be noted that if a message delay is more than a security counter cycle to travel across the PCIE fabric 740 (e.g., the PCIe bus), then a longer clock phase must be indicated in the PCIe. For example, if a worst case delay is 4 cycles, then a 2-bit clock phase encoding, 00, 01, 10, 11 is sufficient.

In some implementations, instead of a common clock, a virtual clock sourced by the PCIe transactions may be implemented, which eliminates the need for using the PCIe TLP prefix field. A host system (e.g., running the application) and a PCIe adapter (e.g., the accelerator) may initialize their counters with the same 128 bit random nonce. This is done only once, per boot or per power-on operation. Each time the adapter does an accelerator 760 read or write to host system memory 710, both the host and the adapter update their respective CTR values (e.g., +1 or LFSR), as such the CTR values will be in sync. Since the initial random nonce at step 1 is always different per boot, there is no reuse of nonces. A host must be able to distinguish the accelerator coming from the secure adapter from other PCIe adapters. i.e., there must be a separate 128-bit counter on the host, one per secure adapter connected to the host.

Figure 8:
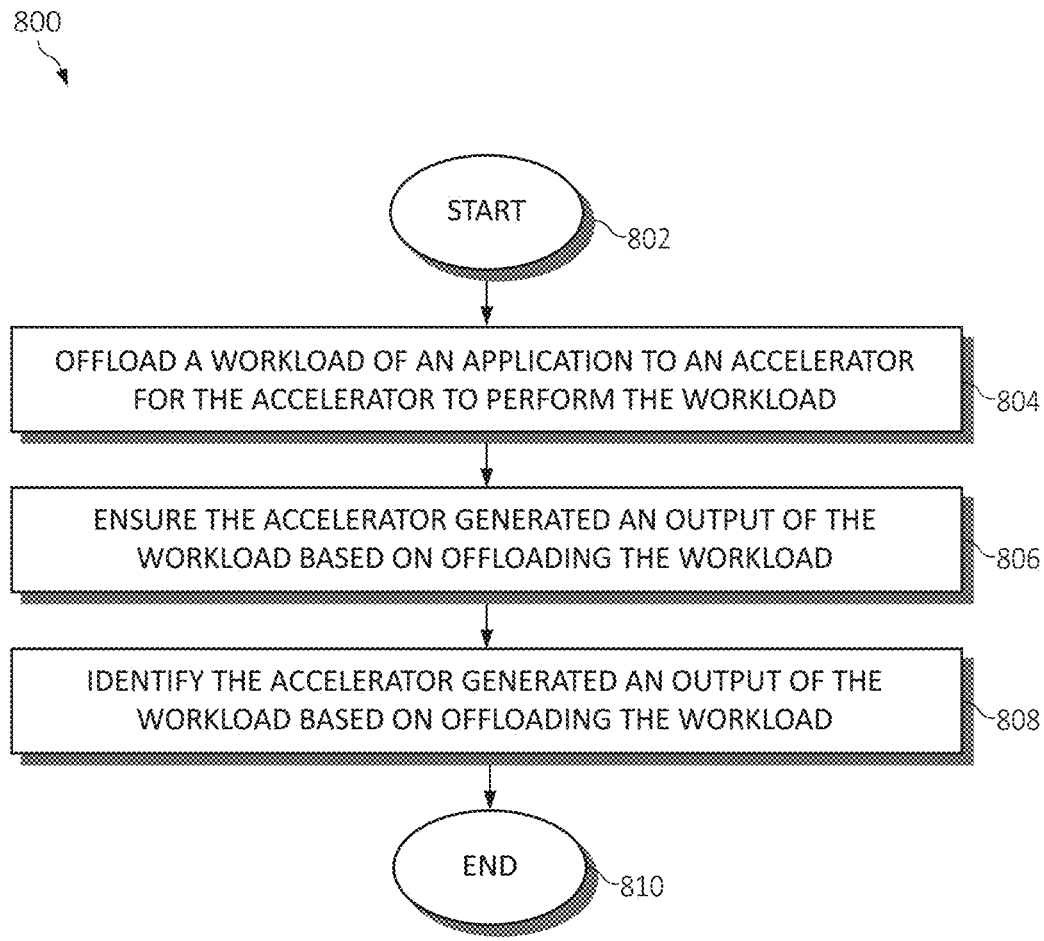
FIG. 8 is an additional flowchart diagram depicting an exemplary method for increasing trustworthiness of an accelerator in heterogenous systems in a computing environment, by a processor, in which aspects of the present invention may be realized.

Turning now to FIG. 8, a method 800 for increasing trustworthiness of an accelerator in heterogenous systems in a computing environment using a processor is depicted, in which various aspects of the illustrated embodiments may be implemented. The functionality 800 may be implemented as a method (e.g., a computer-implemented method) executed as instructions on a machine, where the instructions are included on at least one computer readable medium or one non-transitory machine-readable storage medium. The functionality 800 may start in block 802.

A workload of an application is offloaded to an accelerator for the accelerator to perform the workload, as in block 804. The accelerator is ensured to generate an output of the workload based on offloading the workload, as in block 806. The accelerator is identified as generating an output of the workload based on offloading the workload, as in block 808. The functionality 800 may end, as in block 810.

In one aspect, in conjunction with and/or as part of at least one blocks of FIG. 8, the operations of method 800 may include each of the following. The operations of 800 may receive a job key from the application using a public key cryptography operation. The operations of 800 may receive a security sequence number and a hash from the application. The operations of 800 may receive the security sequence number as a common value between the application and the accelerator, wherein the security sequence number is generated from a synchronized common clock.

The operations of 800 may compare the security sequence number and the hash received from the application with an accelerator generated security sequence number and an accelerator generated hash. The operations of 800 may perform the workload by the accelerator, increment an accelerator generated security sequence number, generate a state hash of the accelerator, and send the output, the incremented accelerator generated security sequence number, and the state hash to enable the application to authentic the accelerator generated the output. The operations of 800 may synchronously track an implicit nonce by at least the accelerator and counting a number of access times by the accelerator to system memory.

The operations of 800 may offload a workload of an application to an accelerator for the accelerator to perform the workload; ensure the accelerator generated an output of the workload based on offloading the workload; identify the accelerator generated an output of the workload based on offloading the workload; ensure that the input and output of the workload are authentic based on offloading the workload to the accelerator; and ensure that the input and output of the workload are transmitted secretly based on offloading the workload to the accelerator.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The descriptions of the embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method performed by an accelerator comprising:
receiving a workload offloaded from an application;
executing the workload, wherein a workload output is generated by the accelerator as a result of the executing;
receiving a security sequence number and a hash from the application;
encrypting a unique state hash of the accelerator, wherein the unique state hash is a hash of the security sequence number incremented by one concatenated with an internal state of the accelerator;
sending the workload output and the encrypted unique state hash of the accelerator to the application; and
when the hash from the application matches the encrypted unique state hash of the accelerator, generating a notification indicating that the accelerator can be trusted, the workload output is authentic and secured, and the accelerator generated the workload output.

2. The method of claim 1, further comprising:
receiving a job key from the application using a public key cryptography operation.

3. The method of claim 1, wherein the workload output is authentic when an identity of the accelerator and an initial state of the accelerator have not been tampered with, and the workload output is secured when data associated with the accelerator is encrypted.

4. The method of claim 3, wherein receiving the security sequence number and the hash from the application further comprises:
receiving the security sequence number as a common value between the application and the accelerator, wherein the security sequence number is generated from a synchronized common clock.

5. The method of claim 3, wherein the internal state of the accelerator is saved in addition to generating the notification when the hash from the application matches the encrypted unique state hash of the accelerator.

6. The method of claim 1, wherein the application decrypts the encrypted unique state hash.

7. The method of claim 1, wherein the workload output is generated in plaintext.

8. A system comprising:
an accelerator with executable instructions that when executed cause the accelerator to:
receive a workload offloaded from an application;
execute the workload, wherein a workload output is generated by the accelerator as a result of the execution;
receive a security sequence number and a hash from the application;
encrypt a unique state hash of the accelerator, wherein the unique state hash is a hash of the security sequence number incremented by one concatenated with an internal state of the accelerator;
send the workload output and the encrypted unique state hash of the accelerator to the application; and
when the hash from the application matches the encrypted unique state hash of the accelerator, generate a notification indicating that the accelerator can be trusted, the workload output is authentic and secured, and the accelerator generated the workload output.

9. The system of claim 8, wherein the executable instructions when executed further cause the accelerator to receive a job key from the application using a public key cryptography operation.

10. The system of claim 8, wherein the workload output is authentic when an identity of the accelerator and an initial state of the accelerator have not been tampered with, and the workload output is secured when data associated with the accelerator is encrypted.

11. The system of claim 10, wherein the program instructions when executed that cause the accelerator to receive the security sequence number and the hash from the application further comprise executable instructions when executed that cause the accelerator to receive the security sequence number as a common value between the application and the accelerator, wherein the security sequence number is generated from a synchronized common clock.

12. The system of claim 10, wherein the internal state of the accelerator is saved in addition to the generation of the notification when the hash from the application matches the encrypted unique state hash of the accelerator.

13. The system of claim 8, wherein the application decrypts the encrypted unique state hash.

14. The system of claim 8, wherein the workload output is generated in plaintext.

15. A computer program product comprising:
one or more computer readable storage media, and program instructions collectively stored on the one or more computer readable storage media, the program instructions for:
receiving a workload offloaded form an application;
executing the workload, wherein a workload output is generated by the accelerator as a result of the execution;
receiving a security sequence number and a hash from the application;
encrypting a unique state hash of the accelerator, wherein the unique state hash is a hash of the security sequence number incremented by one concatenated with an internal state of the accelerator;
sending the workload output and the encrypted unique state hash of the accelerator to the application; and
when the hash from the application matches the encrypted unique state hash of the accelerator, generating a notification indicating that the accelerator can be trusted, the workload output is authentic and secured, and the accelerator generated the workload output.

16. The computer program product of claim 15, further comprising program instructions for:
receiving a job key from the application using a public key cryptography operation.

17. The computer program product of claim 15, wherein the workload output is authentic when an identity of the accelerator and an initial state of the accelerator have not been tampered with, and the workload output is secured when data associated with the accelerator is encrypted.

18. The computer program product of claim 17, wherein the program instructions for receiving the security sequence number and the hash from the application further comprise:
receiving the security sequence number as a common value between the application and the accelerator, wherein the security sequence number is generated from a synchronized common clock, and wherein the internal state of the accelerator is saved in addition to generating the notification when the hash from the application matches the encrypted unique state hash of the accelerator.

19. The computer program product of claim 15, wherein the application decrypts the encrypted unique state hash.

20. The computer program product of claim 15, wherein the workload output is generated in plaintext.

* * * * *